May 17, 1966 J. S. LATAWIEC 3,251,517

ROTARY CLOSURE

Filed May 19, 1965 3 Sheets-Sheet 1

INVENTOR
John S. Latawiec
By Wolfe, Hubbard, Voit & Osann
ATTORNEYS

May 17, 1966 J. S. LATAWIEC 3,251,517

ROTARY CLOSURE

Filed May 19, 1965 3 Sheets-Sheet 2

INVENTOR
John S. Latawiec
by Wolfe, Hubbard, Voit & Osann
ATTORNEYS

INVENTOR
John S. Latawiec
by Wolfe, Hubbard, Voit & Osann
ATTORNEYS

United States Patent Office 3,251,517

Patented May 17, 1966

3,251,517

ROTARY CLOSURE

John S. Latawiec, Lancaster, Pa., assignor to J. L. Clark Manufacturing Co., Rockford, Ill., a corporation of Illinois Filed May 19, 1965, Ser. No. 459,524
2 Claims. (Cl. 222—553)

This application is a continuation-in-part of my copending application Serial No. 311,159, filed September 24, 1963, now abandoned, and relates to the construction of a rotary disk for use as a closure for a container such as that shown in Patent No. 3,129,860 in which the disk is journaled on a top wall of the container having an opening therethrough which registers with a pouring hole in the disk in one angular position of the latter. Turning of the disk opening into and out of this position is effected manually by grasping projections upstanding from the top of the disk to form a hand grip. The assembly and coupling of such disks to the container tops is accomplished in automatic machinery by which the disks and tops are picked up, arranged in a row, and delivered to an assembly station, one disk being coupled to each top. Prior to packing of filled containers for shipment, the disks are turned to positions in which the openings in the container top are covered and closed by the disks, thereby preventing leakage of the contents during shipping and handling.

The general object of the present invention is to provide a rotary closure disk of the above character in which the projections on top of the disk are arranged in a novel manner to make possible the automatic orientation of the disks for assembly on the container tops in positions always closing the openings therein.

Another object is to arrange the disk projections so that the angular positions of the disks may be controlled and sensed by feeling of the sides of the projections during the advance of a row of disks arranged in edge-to-edge relation.

A further object is to use the projections in a novel manner to distinguish between the advancing disks which are oriented within a given angular range and those which are positioned outside of such range.

A more detailed object is to arrange the projections in a novel manner on the disk so as to divide the top of the disk into areas of different sizes capable of being distinguished from each other during edgewise movement of the disks to the assembly station and utilized either to turn the disks to a desired angular position or to eject the disk from the feeder.

Other objects and advantages of the invention will become apparent from the following detailed descriptions taken in connection with the accompanying drawings, in which—

Figure 1:
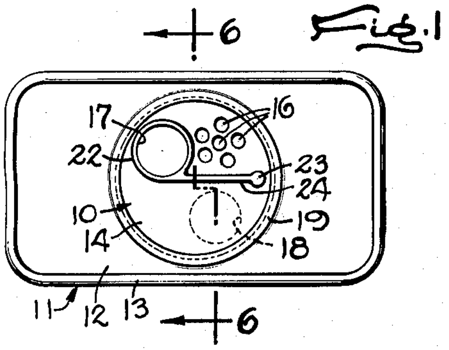
FIGURE 1 is a plan view of a container provided with a closure disk embodying the novel features of the present invention.
Figure 2:
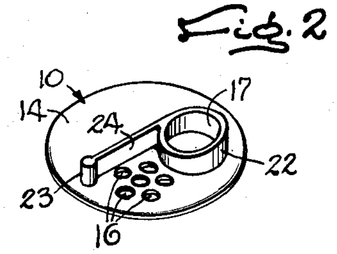
FIG. 2 is a perspective view of the disk.

As shown in the drawings for purposes of illustration, the invention is embodied in a rotary closure 10 for a container 11 of generally rectangular cross-section having a top wall 12 joined to the container by a standard seam 13. The closure is in the form of a circular disk 14 disposed in and seated against the bottom of a cup-like depression 15 in the top wall and journaled in the cup for manual turning to different angular positions to bring holes 16 and 17 in the disk selectively into and out of register with an opening 18 (FIGS. 1 and 6) in the bottom of the cup.

Figure 6:
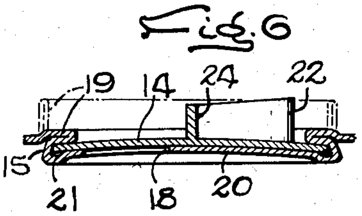
FIG. 6 is an enlarged fragmentary sectional view taken along the line 6—6 of FIG. 1.

As shown in FIGS. 1 and 6, the top wall 12 is a flat metal sheet with the cup formed at its center and surrounded by an annular rib 19 initially projecting upwardly from the cylindrical sidewall of the cup as shown in broken lines in FIG. 6. The bottom of the cup is dished or curved upwardly to form a rounded dome 20 (FIG. 6) of pronounced convex curvature and is surrounded by a shallow groove 21 separating the dome from the sidewall. A circular hole is punched through the dome near the peripheral edge thereof to form the dispensing opening 18.

The disk 14 is flat and relatively thin and preferably is composed of resiliently flexible material such as high density polyethylene, the disk being larger in diameter than the diameter of the dome 20 but smaller than the diameter of the cup wall 15. The disk is inserted in the cup and positioned against the dome with the peripheral portion of the disk overhanging the groove 21. With the disk in this position, the rib 19 is bent inwardly against the top of the disk to exert downward pressure on the overhanging portion and bend the disk into firm face-to-face sealing engagement with the dome.

To provide for selective sifting or pouring of powdered material from the container, a group of sifter holes 16 is formed near the periphery of the disk 14 in radial alinement with the dispensing opening 18 in the dome 20, and the pouring hole 17 is approximately the same size as the dispensing opening and is formed in the disk in radial alinement with the sifter holes but, angularly spaced from the latter. A tubular spout 22 molded integrally with the disk and surrounding the pouring hole projects upwardly from the top of the disk. In one angular position of the disk relative to the container top 12, the sifter holes 16 register with the dispensing opening, and in another position, the pouring hole and spout register with the opening. In all other positions, the opening is covered and effectively sealed by the imperforate portion of the disk.

In this instance, the pouring spout 22 is utilized as part of the hand grip for turning the disk 14 and relative to the container 11 between sifting, pouring and closed positions. The remainder of the grip comprises a narrow rib 24 upstanding from the top of the disk and preferably joined at one end to the spout as shown in FIGS. 1 through 10. A cylindrical pin 23 of approximately the same height as the spout is molded integrally with the other end of the rib and disposed adjacent the edge of the disk generally opposite the spout. With this arrangement, the hand grip may be grasped between the thumb and forefinger of the user, usually at the spout and the pin 23, to turn the disk to the sifting or pouring positions or to an intervening position in which the dispensing opening 18 is closed.

During assembly of the closures 10 on the container tops 12 with automatic high production machinery, container tops are conveyed one by one through assembly station beneath an escapement 25 (FIG. 3) at the end of a track 26 along which the disks are moved in edge-to-edge relation into the escapement for positioning on the tops passing the escapement. Beyond the escapement, the tops and the disks move into an assembly machine 27 for rolling the ribs 19 over the peripheries of the disks to journal the latter on the tops. Herein, the left portion of the track is formed by the flat upper surface 26ª of an elongated horizontal bar 28 (see FIG. 4), the surface 26ª being slightly wider than the diameter of the disks.

Preferably, the disks are fed onto and along the track 26 by a vibrating hopper 34 (FIGS. 3 and 7) formed with an upwardly facing ledge 35 extending helically upwardly from the bottom of the hopper around the inside wall thereof and merging at its upper end with the track surface 26ª to form a continuation of the track at the right end of the bar 28. In a manner well known to those skilled in the art, the drum is vibrated to advance the disks from a supply in the bottom of the drum onto the ledge 35 and then step by step upwardly along the ledge in random angular positions and onto the bar 28. One vibrating hopper suitable for this purpose is the type in which the vibratory motion of the drum first kicks the disks upwardly and a short distance clockwise (FIGS. 3 and 7) about the hopper axis, and then moves the drum reversely while the disks are in the air thereby producing a step-by-step forward motion of the disks. The ledge 35 is of approximately the same width as the disk diameter and is included downwardly and radially outwardly so that the disks hug the helical sidewall 36 of the hopper and advance single file along the ledge and onto the bar 28, the latter also being vibrated to advance the row of disks along the bar and through the escapement 25 which is shown only schematically herein.

In accordance with the present invention, the projections upstanding from the top of each disk 14 are arranged in a novel manner to divide the top of the disk and define unobstructed areas A and B of substantially different sizes on opposite sides of the projections which may be distinguished from each other automatically during the feeding of the closure 10 toward the tops 12 and utilized to turn the disks a predetermined angular position if the disks are disposed within a certain range of angular positions, and to eject the remainder of the disks from the track 26.

To the foregoing ends, the upstanding projections on top of the disk 14 are arranged on the disk to provide laterally facing abutments disposed above the remainder of the closure lying along and defining two intersecting lines 38 and 39 extending along chords of the disk defining the two segments A and B of substantially different maximum widths, the projections lying within the acute included angle of the lines with the abutments facing outwardly toward the periphery of the disk. While different arrangements of the top projections may be employed to define the lines 38 and 39 and the segments A and B, the larger of the segments is bounded in the present instance by points 38ª and 38ᵇ on one side of the spout 22 and the pin 23 on the opposite end of the rib 24, and the smaller segment is defined by points 39ª and 39ᵇ on the opposite sides of the spout and the pin.

Herein, the pin 23 and the rib 24 are formed on a diameter 40 (FIG. 10) of the disk 14 that is tangent to one side of the pouring spout approximately at the point 38ª. The sifter holes 16 preferably are formed on the same side of this diameter as the spout and are closely adjacent the spout, and the entire segment A is imperforate and disposed well below the level of the tops of the projections in the disk 14.

Figure 11:
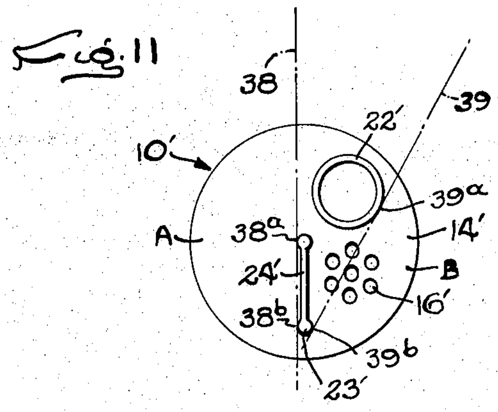
FIG. 11 is a plan view similar to FIG. 10 showing an alternate embodiment of the invention.
Figure 12:
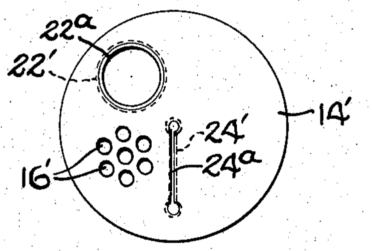
FIG. 12 is a bottom view of the closure in FIG. 11.

Atlhough the rib 24 in the preferred form shown in FIGS. 1 through 10 is integrally joined to the spout 22, it will be seen in the alternate embodiment in FIGS. 11 and 12, in which corresponding parts are indicated by corresponding primed reference numbers, that the rib 24' may be separated from the spout 22' without departing from the invention. Because of the differences in the shrinkage of molded plastic parts during cooling of the plastic, shrink lines form on the underside of the disk beneath the spout and along the rib as indicated at 22ª and 24ª in FIG. 12. Separation of the rib from the spout separates these shrink lines from each other and thus reduces the amount of material that can work under the disk 14' and away from the spout. In all other respects, the two forms of the invention may be the same. Again, points 38ª, 38ᵇ and 39ª and 39ᵇ defined by the sides of projections upstanding from the disk lie along two lines 38 and 39 dividing the disk into two segments A and B of distinguishably different sizes. The only difference in this respect is the fact that a pin integral with the end of the rib adjacent the spout defines the point 38ª.

In the present instance, the relative positions of the segments A and B of each disk 14 moving along the track 35, 26 toward the escapement 25 are sensed by moving one segment of the disk under a member overlying the outer side of the track, bringing the abutments 38ª, 38ᵇ or 39ª, 39ᵇ defining that segment against a guide edge on the member, and sensing the distance the disk 14 extends beyond the guide edge in this condition of the disk. Since the two segments are of substantially different widths, the disk extends substantially different distances beyond the guide edge when different pairs of abutments are in engagement with the edge thereby providing a basis for readily distinguishing between the disks in the two different angular positions along the guide member.

Figures 7, 8:
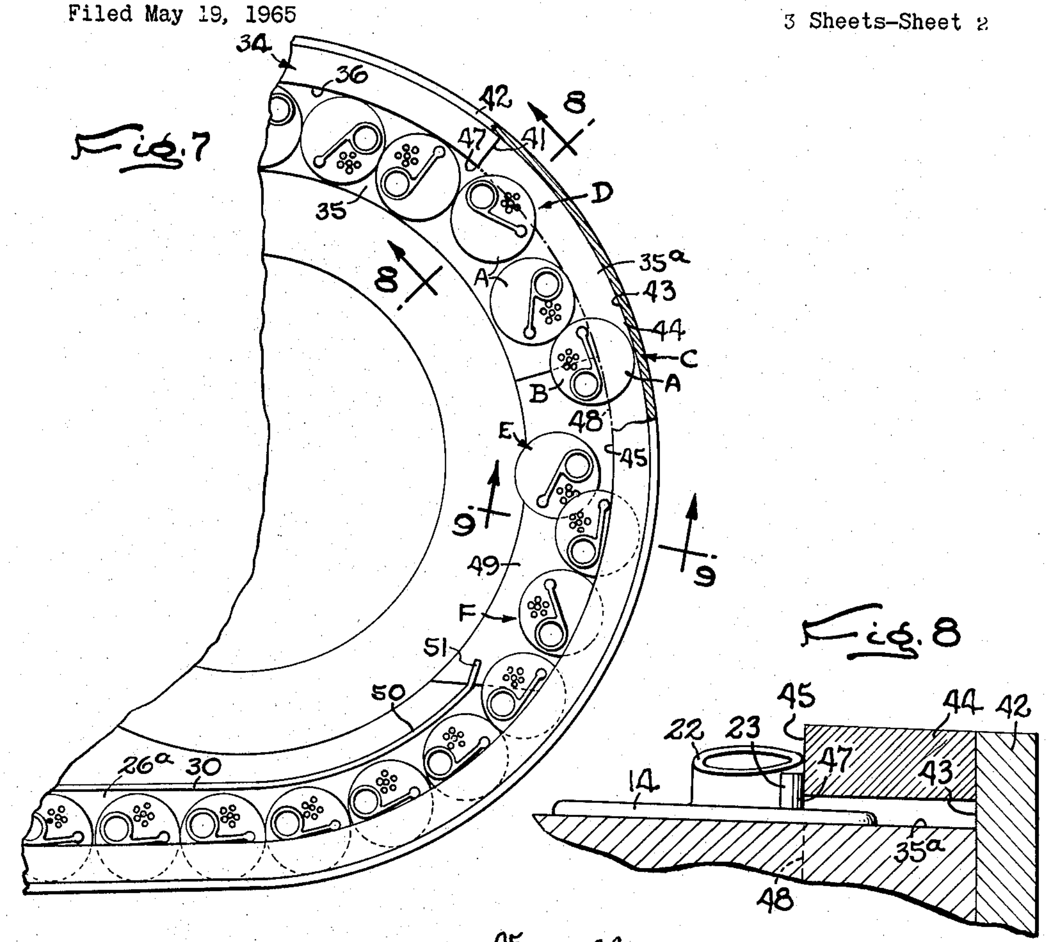
FIG. 7 is an enlarged fragmentary view of another portion of FIG. 3.
FIG. 8 is an enlarged fragmentary sectional view taken along the line 8—8 of FIG. 7.
Figure 9:
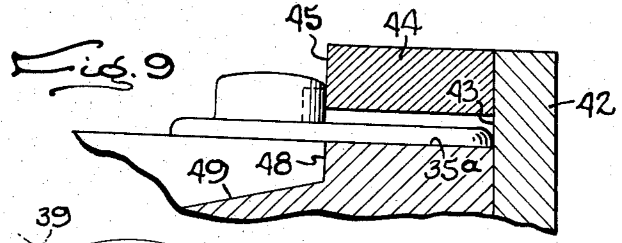
FIG. 9 is an enlarged fragmentary sectional view taken along the line 9—9 of FIG. 7.
Figure 10:
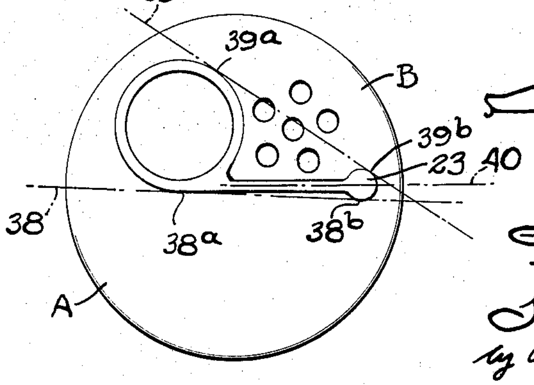
FIG. 10 is an enlarged plan view of the cap shown in FIG. 2.

As shown in FIGS. 7 and 8, the upper end section 35ª of the ledge 35 is wider than and offset radially outwardly from the remainder of the ledge to form a lateral step 41 in the track at the end of the sidewall of the hopper, this step also being inclined downwardly and radially outwardly as shown in FIG. 8. A bar 42 curved around the exterior of the hopper forms an offset extension 43 of the sidewall 36 and support a cover bar 44 which overhangs the track above the level of the disks 14 but below the level of the upper ends of the spouts 22, the ribs 24 and the pins 23. The inner edge 45 of this bar is spaced from the offset sidewall 43 a distance slightly greater than the maximum width of the wider segments A, and follows the curvature of the sidewall around the upper end of the cover bar.

As each disk passes the shoulder 47 formed by the offset in the sidewall 36, 43, the drum vibration and the incline of the lateral step 41 cooperate to shift the disk radially outwardly and partially under the guide bar 45. If, during this movement, only one of a pair of abutment surfaces engages the edge 45, the disk pivots on the edge until both abutments of the pair engage the edge and the associated line 38 or 39 lies beneath the edge.

It will be seen that there are two angular positions that the disks will assume along the bar 44. If the spout 22 is ahead of the pin 23 as the disk passes the shoulder 47, the projection on the disk will settle against the guide edge 45 as indicated generally at C in FIG. 7 with the line 38 beneath the edge and the wider segment A beneath the bar. This is the proper angular position for assembly of the disks in the closed positions. If, on the other hand, the pin 23 is ahead of the spout as the disk passes the shoulder, the projections settle against the guide edge in the manner shown at D in FIG. 7 with the smaller segment B under the guide bar 44 and the line 39 beneath the edge 45. Due to the difference in sizes of the segments, disks in the disoriented positions shown at D are offset inwardly from those in the oriented position shown at C.

Thus, it will be seen that the arrangement of the pouring spout and the rib 24 make it possible to turn each disk 14 into one of two angular positions and then sense the angular position of the disk during the feeding of the disk along the track 26.

To eject the disoriented disks 14 from the track 35, 26, the width of the ledge is reduced beyond the shoulder 47 to an amount less than the diameter of the disks. The width of the ledge is such that oriented disks remain on the track but disoriented disks, which overhang the inner side 48 of the ledge by a greater amount, and any disks that may not have slid under the guide plate 44, fall off the track and slide down an incline 49 (FIGS. 7 and 9) into the hopper as shown at E. A curved pick-off finger 50 is positioned along the inside of the surface 26a with its free end 51 inclined away from the track to wipe off any improperly positioned disks remaining on the track and to cam the remaining disks, such as that shown at F, outwardly to move the abutments 38a, 38b close to the edge 45.

Figures 3, 4:
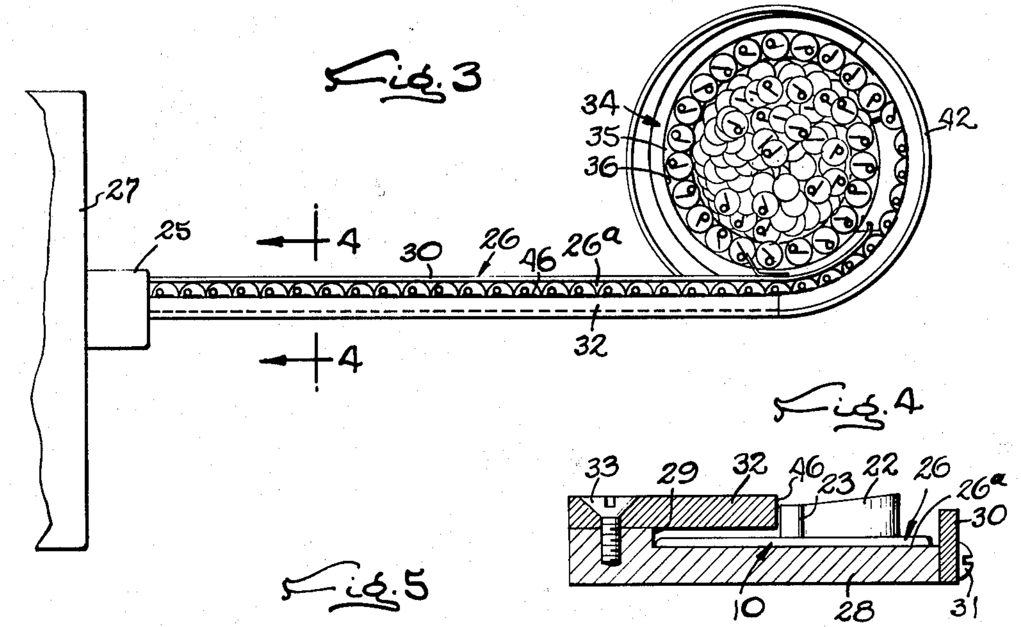
FIG. 3 is a fragmentary plan view on a reduced scale of a machine for delivering the disks to the assembly station.
FIG. 4 is an enlarged fragmentary sectional view taken along the line 4—4 of FIG. 3.
Figure 5:
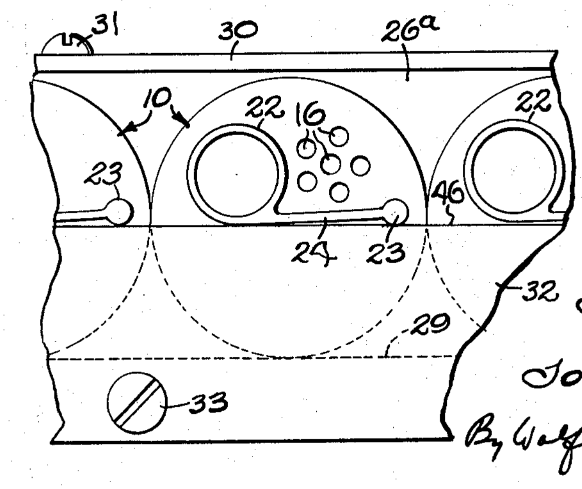
FIG. 5 is an enlarged fragmentary view of a portion of FIG. 3.

The left end (FIG. 3) of the pick-off finger 50 merges smoothly with a side rail 30 fastened by screws 31 to the bar 28, and a straight cover bar 32 is fastened to the top of the bar 28 by screws 33 in the manner shown in FIG. 4 to project beyond a shoulder 29 on the bar and overhang the track. The shoulder 29 forms a continuation of the sidewall 43 and the bar 32 and its edge 46 form continuations of the bar 44 and the guide edge 45. Thus, the disks are guided along the track 26 and are positively held in the oriented positions all the way to the escapement 25 with the pouring spout 22 and the sifter holes 16 on the left-hand half of the disk 14 as viewed in FIG. 9. Each container top is conveyed past the escapement with the cup beneath the path of the disks and with the dispensing opening 18 beneath the right-hand imperforate half of the disk. Accordingly, the disks are assembled as shown in FIG. 1 in the closed position.

From the foregoing, it will be apparent that the novel arrangement of the pouring spout and the rib 24 on the disk 14 make it possible to assemble the disk on the container tops 12 automatically in tightly closed positions with relative simple machinery and at high production rates. Positioned in the manner described, these projections cooperate with the guide edge 45 in performing the new functions of guiding generally oriented disks into the proper position and of rejecting improperly positioned disks automatically as an incident to the delivery of the disks to the escapement 25, thus eliminating the need for inspection and closing operations on the disks after assembly on the tops.

I claim as my invention:

1. A rotary closure adapted to be advanced edgewise along a supporting surface and oriented during such advance in a predetermined angular position, said closure comprising a circular disk with a hole therethrough offset from the disk axis and disposed adjacent the peripheral edge of the disk, a tubular spout fast on and upstanding from one side of said disk and encircling said hole, and an elongated rib fast on and upstanding from said one disk side along a diameter of the disk tangent to one side of said spout with one end of the rib joined to the spout and the other end adjacent said peripheral edge and angularly spaced from the spout, said rib and said spout being disposed above the remainder of said closure whereby the rib and the spout are positioned to serve as a hand grip and also as means for orienting said closure in a predetermined angular position during the edgewise advance of the disk.

2. A rotary closure for a container having the characteristic of being movable edgewise along a supporting surface and oriented during such movement to a predetermined angular position, said closure including a flat disk-like base having a hole therein and provided with a substantially flat side for movement along the supporting surface, the hole being offset from the axis of said base; a tubular pouring spout upstanding from the opposite side of said base; a turning rib formed on said base and upstanding therefrom on the same side as said pouring spout, at least a portion of said rib and said spout extending upwardly from said opposite side a sufficient distance to form two pairs of laterally facing abutments disposed above the remainder of said closure; each pair of said abutments lying on and defining one of two intersecting lines extending along chords of said base and defining two segmental base areas of substantially different sizes, at least one of said lines being generally tangent to said spout; said spout and said rib being disposed on the portion of said base between said lines such that said pairs of laterally facing abutments define positioning means for orienting the closure in said predetermined position during edgewise movement of the closure along said surface.

References Cited by the Examiner

UNITED STATES PATENTS

| | | | |
|---|---|---|---|
| 2,971,681 | 2/1961 | Galbierz | 222—548 |
| 3,100,589 | 8/1963 | Love | 22—548 X |
| 3,129,860 | 4/1964 | Foster | 222—512 |
| 3,140,804 | 7/1964 | Frank | 222—480 |

ROBERT B. REEVES, *Primary Examiner.*

LOUIS J. DEMBO, *Examiner.*

F. R. HANDREN, *Assistant Examiner.*